US005444229A

United States Patent [19]

Rudolph et al.

[11] Patent Number: 5,444,229

[45] Date of Patent: Aug. 22, 1995

[54] DEVICE FOR THE INDUCTIVE FLOW-HEATING OF AN ELECTRICALLY CONDUCTIVE, PUMPABLE MEDIUM

[75] Inventors: Manfred Rudolph, TUM, Lehrstuhl für Energiewirtsch, D-80290 München; Georg Stock, Munich, both of Germany

[73] Assignees: Manfred Rudolph; Forschungsstelle für Energiewirtschaft der Gesellschaft für praktische Energiekunde E.V., both of Munich, Germany

[21] Appl. No.: 283,257

[22] Filed: Aug. 1, 1994

[30] Foreign Application Priority Data

May 2, 1994 [DE] Germany ........................ 44 15 389.9

[51] Int. Cl.[6] ............................................... H04B 6/10

[52] U.S. Cl. .................................... 219/630; 219/629; 219/672

[58] Field of Search ................ 219/630, 629, 628, 672

[56] References Cited

U.S. PATENT DOCUMENTS 1,918,637 7/1933 Fendt et al. ......................... 219/630
3,388,230 6/1968 Cunningham et al. ............. 219/630
3,414,698 12/1968 Bedford et al. ..................... 219/630
4,341,936 7/1982 Virgin ................................ 219/630
4,560,849 12/1985 Migliori et al. ..................... 219/629

*Primary Examiner*—Philip H. Leung
*Attorney, Agent, or Firm*—Scully, Scott, Murphy & Presser

[57] ABSTRACT

Device for the inductive flow-heating of an electrically conductive pumpable medium, whereby there are provided in the device pipeline windings, through which the medium flows, on a magnetic yoke in which with the aid of an inductive alternating current energy transfer in accordance with the transformer principle electric voltages are induced. At least two such pipeline windings are connected with each other via supply distributor and mixer pieces in such a way that a short-circuit current flows in a closed path of the medium in the pipeline windings, fed by the induced voltages, which heats the medium. A further development provides that there are provided heating elements connected with the pipeline windings and adapted in dimensions to these windings, in which heating elements a rapid local heating can be obtained through current density concentration.

20 Claims, 8 Drawing Sheets

DEVICE FOR THE INDUCTIVE FLOW-HEATING OF AN ELECTRICALLY CONDUCTIVE, PUMPABLE MEDIUM

The present invention relates to a device for the inductive heating of a pumpable medium, to be effected during flowing, which medium has a specific electrical conductivity, that lies at least in terms of order of magnitude in the region of that of electrolytic conductivity, in particular amounting to less than 100 S/m. This medium can be either 100% liquid (pure liquid, emulsion and the like) or can be a liquid which contains solid particles, whereby these particles merely must not be so large that the pumping and the through-flow of the medium (containing these particles) through the appropriately dimensioned device is no longer ensured.

It is known to heat liquids by means of electric currents which flow through them. A first method is to cause electric current to flow through the liquid by means of an electrical potential applied between electrodes which are immersed in the liquid (so-called direct Ohmic heating). This procedure requires that the liquid comes into contact with the electrically conductive surface of the electrodes. Thereby undesired electrochemical reactions can take place at the electrodes. Also, during such a heating process, the electrodes may heat up to a considerable extent.

A further known method of heating up materials is by means of microwaves in the GHz range. Thus is a dielectrical heating. The question of to what extent microwave heating can cause disadvantageous changes e.g. in food, has not been fully resolved. In particular with microwave heating an uneven heating profile can appear, which causes problems, the solving of which requires further technical efforts.

Still another method of heating liquids or flowable material is by means of electromagnetic induction, in essentially metallic conductive materials. This inductive heating is of major importance, especially in industry and in particular in the field of metallurgy, where metals are melted e.g. in ring induction furnaces. Inductive heating is also commonly used for surface hardening metal objects, whereby the low penetration depth of the induction currents into these materials of high conductivity occurring even at low frequencies is a desired physical characteristic.

An object of the present invention is to heat up a pumpable medium, a liquid which might possibly contain solid particles, in the flow-heating process.

In particular, it is an object to avoid any contact of the medium with electrodes and the like that are not completely indifferent to or inert with respect to the medium and/or take on a higher temperature than the respective selected heating temperature of the medium.

In particular it is an object to exclude any possibility that the physical mode of heating of the medium may cause disadvantageous changes therein.

Preferably an object is that the heating process effected during flow-through in the device according to the invention should be carried out very rapidly. It should be possible for example to raise the medium to a selected high temperature in a short time (and, if appropriate, be cooled immediately afterwards). Thereby, any possibility of part volumes of the medium being heated in the heating zone to a higher temperature than the selected heating temperature, even for a short period of time, should be excluded, i.e. the heating of the medium with regard to the respective temperature reached is achieved with homogeneous temperature distribution in the medium to a greatest possible extent.

In particular, the device should be formed so that a potential earthing is present, which ensures reliable contact safety, without however impairing the efficacy of the device.

The investigations by the inventors directed towards achieving the above-mentioned objects, in particular to achieving these objects considered all together, in a single device, resulted in devices as set out in claim 1 and in the further claims.

In a device according to the present invention, the heating of the pumpable medium, the liquid possibly containing solid particles, occurs without electrical contact inductively, by means of an electric alternating current in a frequency range which according to current state of knowledge is safe for example even for foodstuffs. The device according to this invention comprises for the main part a ferromagnetic core or magnetic yoke made of a material with a high permeability, as little magnetic resistance as possible and as little magnetic dispersion loss, eddy current loss and hysteresis loss as possible. With regard to its flow within the device, the medium that is to be heated is divided in terms of quantity between at least two pipelines, which are wound around the core or arranged on the magnetic yoke in a coil-like manner, in the fashion of an electrical winding. Thus, at least two such pipeline windings are provided, each of which is located in the device between a common supply distributor for the pumpable medium and a common mixer for bringing the medium together again. Thus, in the at least two windings there are flows of medium which are separate from each other. Further, the supply distributor is connected with the feed line and the mixer is connected with the discharge line for the flowing medium. The walls of the pipelines, of the supply distributor and the mixer are of materials which are inert/indifferent with regard to the medium, which materials are, at least as far as pipelines between the supply distributor and the mixer are concerned, at least to a large extent electrically non-conductive. There should be able to flow in the material of the pipeline windings only electric currents of such size that, as compared to the electric currents induced in the medium in the pipeline, they are negligibly small.

The functional principle of the invention is to induce electrical voltage and to cause electrical short-circuit (a.c.) current to flow in the medium in each of the component flows between the supply distributor and the mixer, i.e. essentially in the pipeline windings. This current flows in a path which is closed or ring-form, formed in the device by the sequence of the supply distributor, a first pipeline winding, the mixer, a (the) second pipeline winding and again the supply distributor. This short-circuit current flows in this closed path independently of the direction of the flow of the medium in the pipeline winding concerned. This short-circuit current is fed by the respective electric voltages induced in each of the two pipeline windings, which voltages are effective in series and add together—augment each other constructively or vectorially (i.e. do not cancel each other out). Thereby it is important to consider the correct choice of the respective directions of winding of the pipeline windings on the common magnetic yoke, namely that the electric voltages which are induced in the windings actually add together one after the other in this short-circuit path.

The induction can be generated, in each case in a appropriately configured device according to the invention, with single-phase alternating current or with rotary (three-phase) current, whereby for the latter case at least one such pipeline winding is to be provided for each of the three phases. For the rotary current arrangement, in the most simple case, there are three pipeline windings provided between the supply distributor and the mixer and in the pipeline windings arranged on the correspondingly formed magnetic yoke the induction voltages are induced correspondingly phase-displaced. This results in three superimposed short-circuit currents, adding together with phase displacement, in the pipeline windings.

A particularly important further development of the invention is the application of a respective heating piece to a each pipeline winding, preferably, with reference to the to the flow of the medium, between the pipeline piece and the mixer. This means that the heating pieces are additionally present in the total current path of the above-described short-circuit current circuit, whereby however no induction need be provided in the heating pieces.

Further explanation relating to a device according to the invention and to further developments and further configurations thereof is given below with reference to the description of the preferred embodiments shown in the drawings.

FIG. 1 shows the constructional principle of a device according to the invention, along with an important further development, in a perspective outline representation.

FIGS. 2*a* and 2*b* show sectional views of a configuration of a pipeline winding.

FIGS. 3*a* and 3*b* show configurations of a heating piece for a further developed device according to FIG. 1.

FIGS. 4*a* and 4*b* show sectional views of a configuration of FIG. 1. a magnetic yoke with an additionally provided fluid cooling device.

Figure 1:
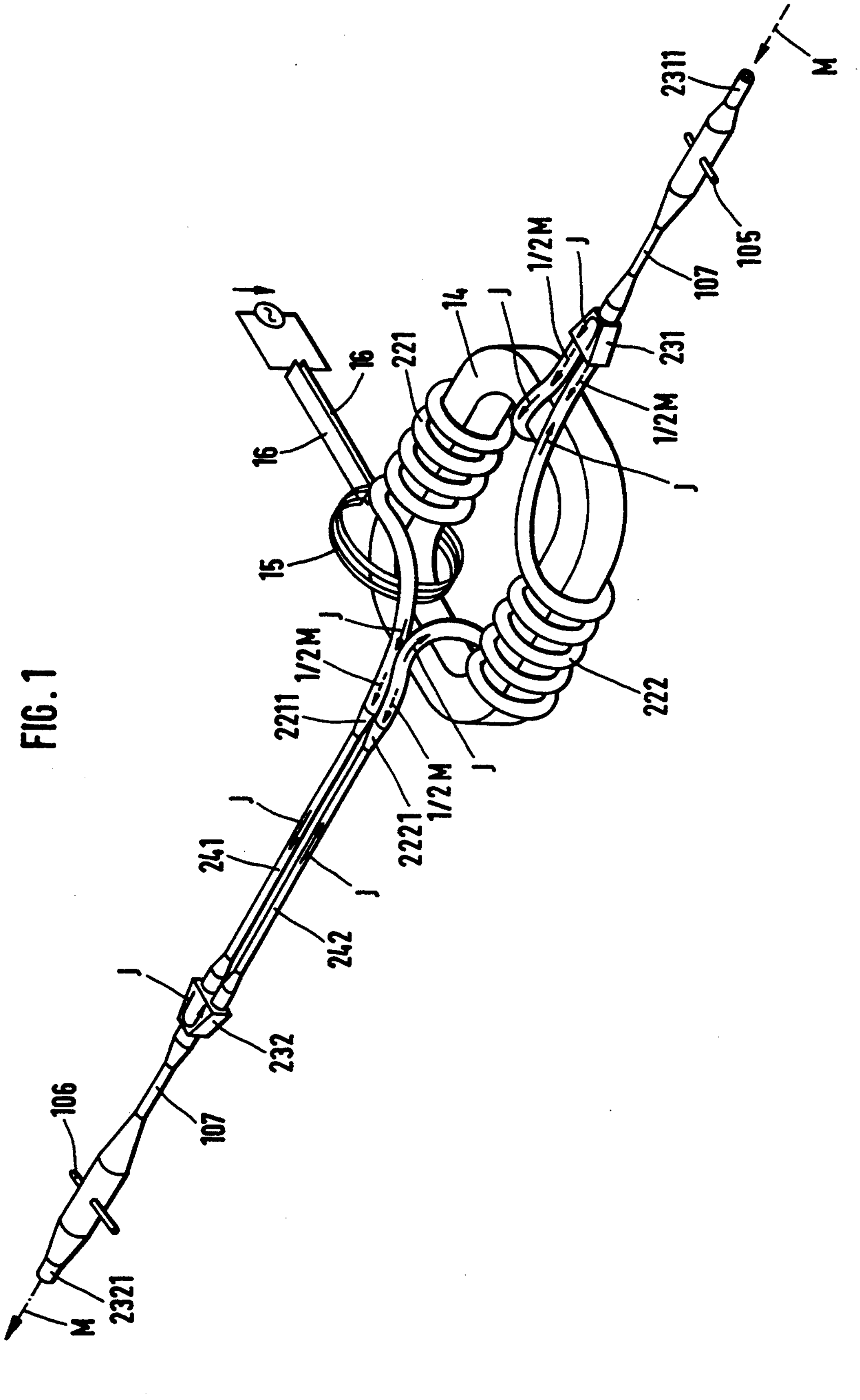
Figure 2B:
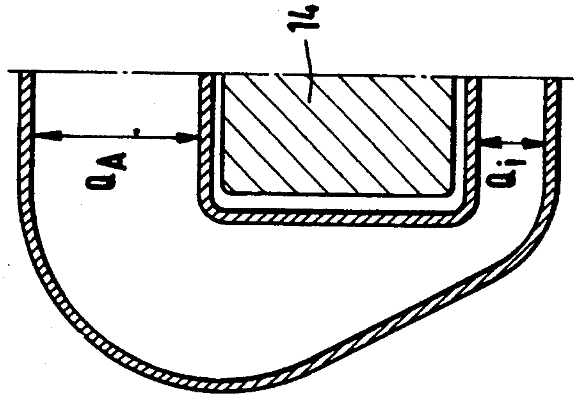
Figure 2A:
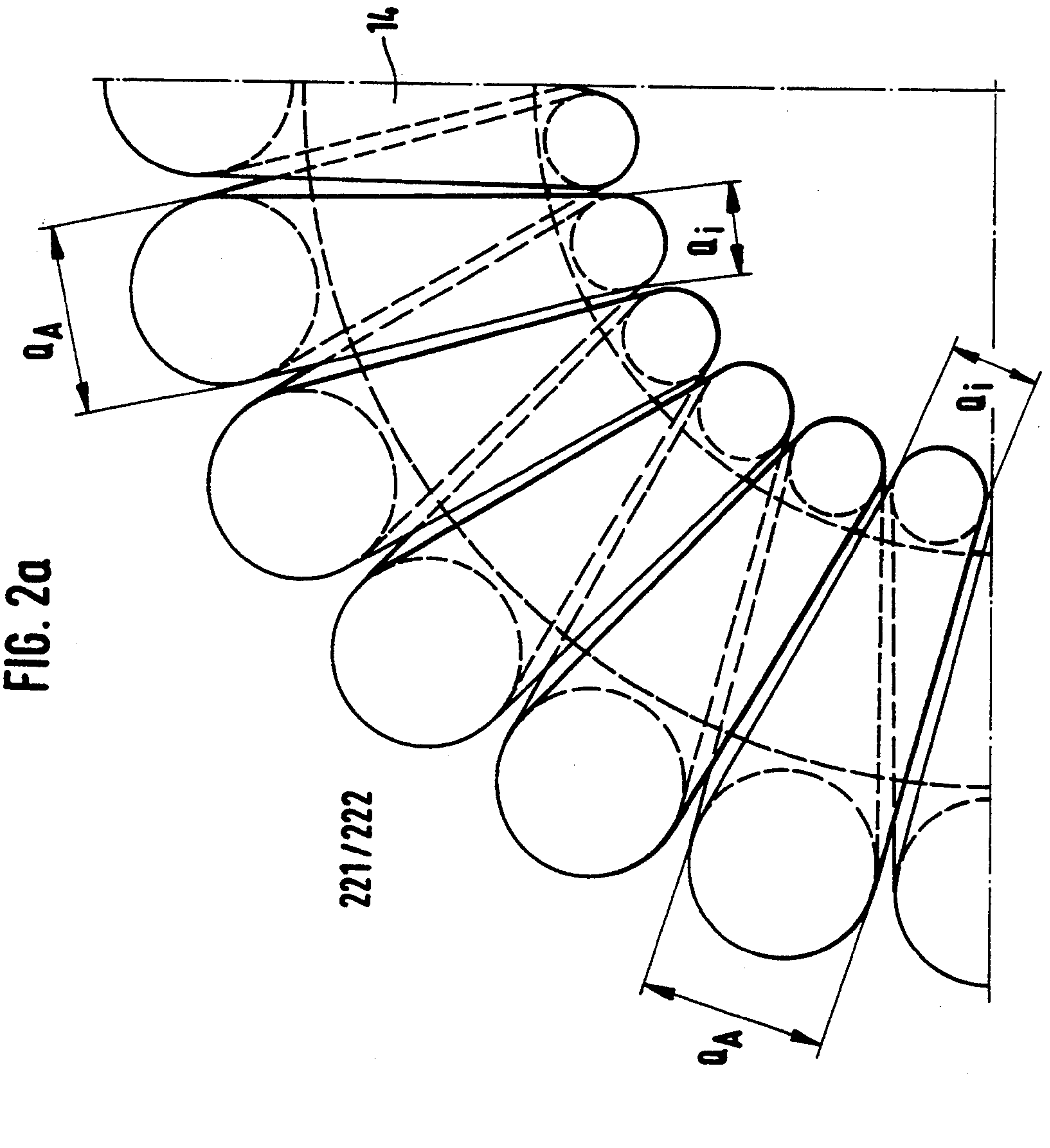
Figure 3A:
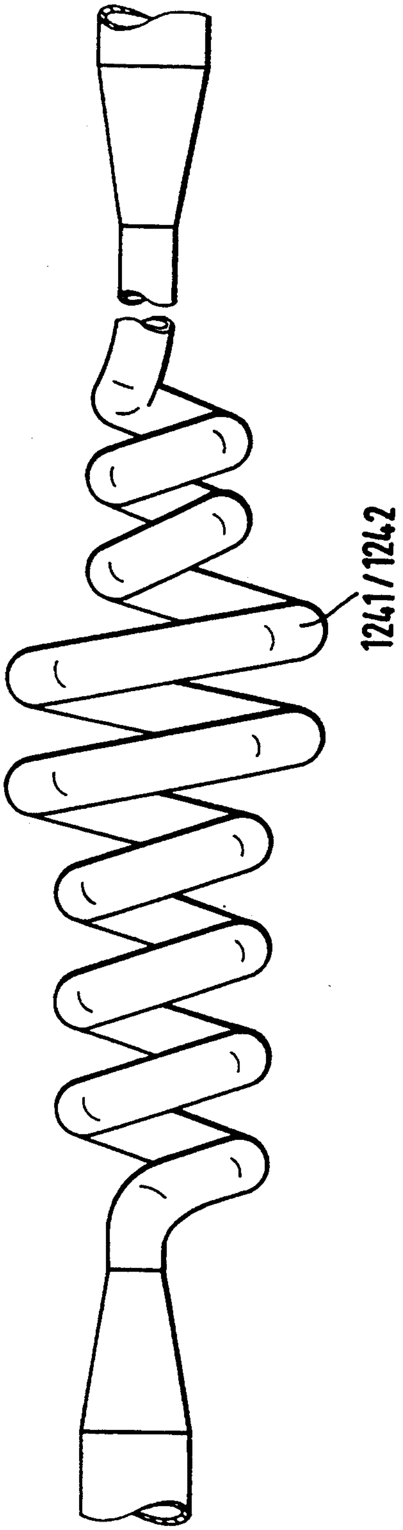
Figure 3B:
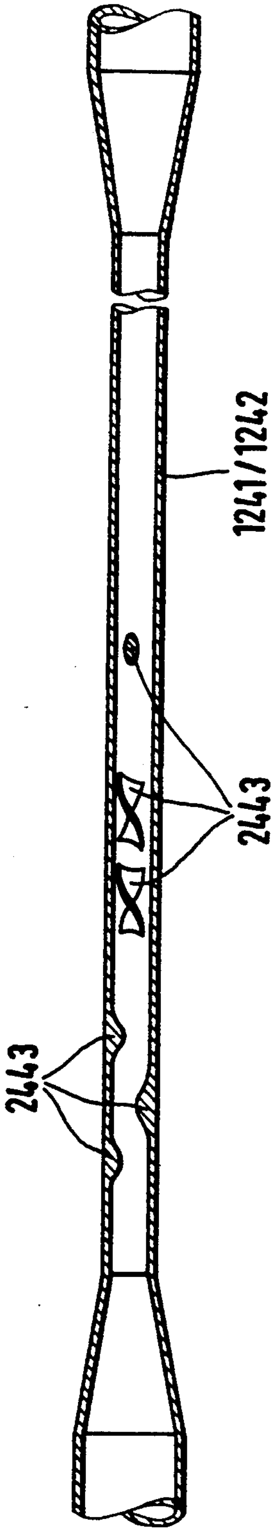
Figure 4A:
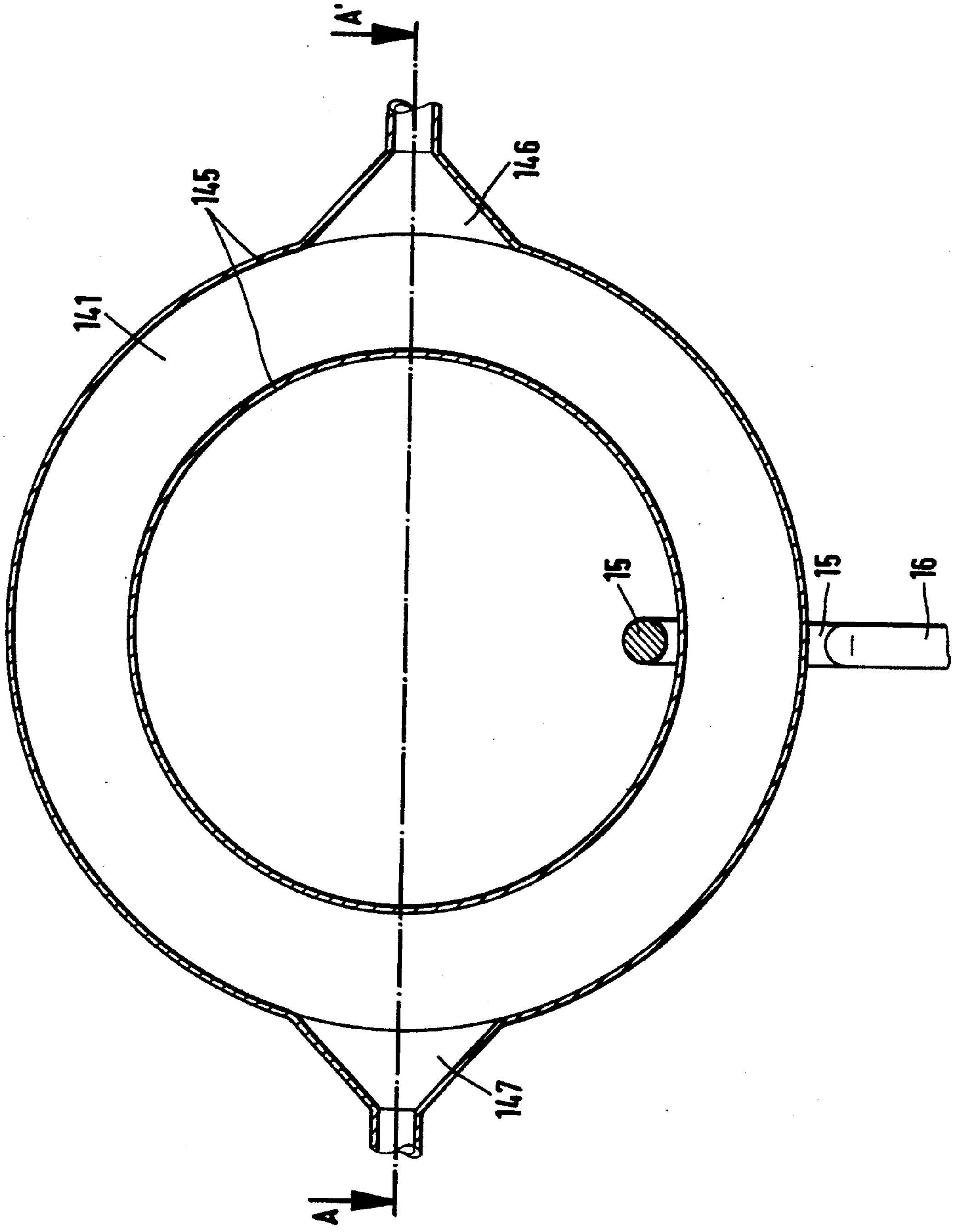
Figure 4B:
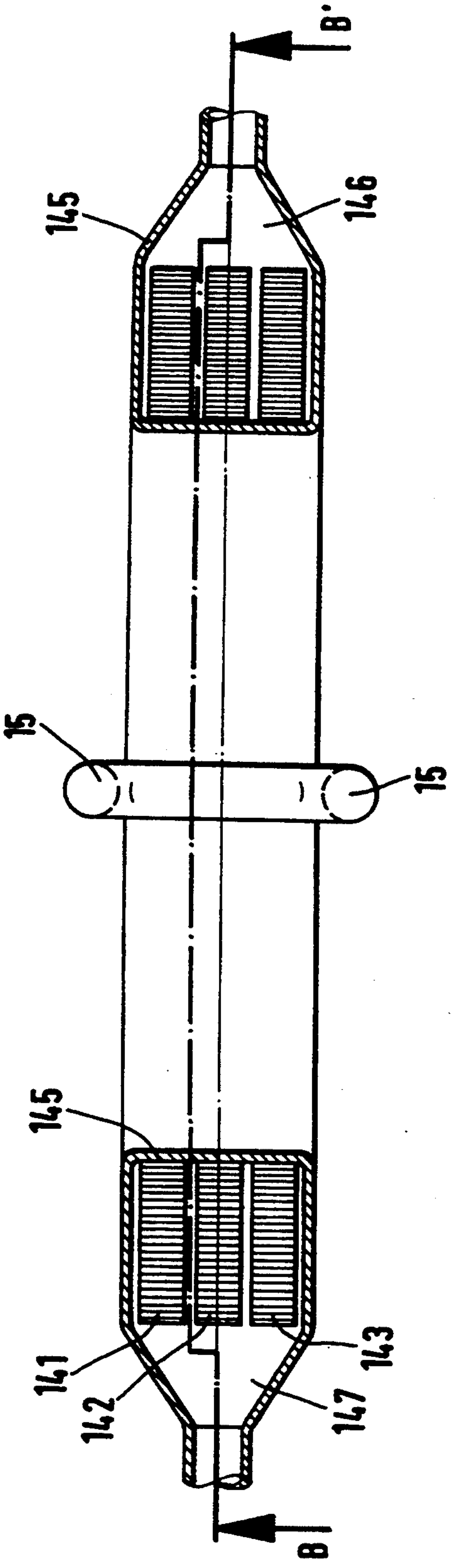

A device according to the present invention has a magnetic yoke 14 which is represented as oval frame in FIG. 1 for reasons of easier representation of the perspective view. In practice it is preferable to use the toroidal form or a form at least approximating to the toroidal form—as shown in the still to be discussed top and side views of FIGS. 4*a* and 4*b*—particularly out of consideration for the preferred provided frequency range of the magnetic field excitement which lies approximately between 50 kHz and 300 kHz. It is advisable to utilize a ring strip core for the indicated frequency range, namely, as is illustrated in FIG. 4*b*, a magnetic yoke which consists of several rings which are axially arranged one over the other with spacings from one another. This enables a more efficient cooling, as will be explained subsequently in more detail. A winding of the excitation magnetic field coil is designated as 15 with its connections 16. In order to keep the necessary excitation voltage low, preferably there is just one single winding provided between the connections 16, at which, for a practical example, for instance a voltage of 300 to 350 volt is to be applied. It may be advantageous to provide several separate windings connected in parallel for such a magnetic field coil 15, for example to allow lesser current to flow in a single winding.

Pipeline windings, already mentioned above, provided for the device according to the invention are designated as 221 and 222. These helix-form pipelines each encircle the magnetic yoke, so that the magnetic excitation flux generated with the magnetic field coil 15 also flows through the winding surface of windings 221 and 222. As these pipeline windings preferably consist of electrically non-conducting material, a current flow results in the medium within the windings 221 and 222 on account of the voltage induction. The pipelines of these windings 221, 222 consist of low permeability material, as do the subsequently described further parts serving for guiding the medium flow.

As can also be seen from FIG. 1, the device represented therein includes a supply distribution piece 231 and a mixer piece 232 for bringing together once again the medium flows in windings 221 and 222, previously divided in the distribution piece. As seen from the arrows M inserted in FIG. 1, the supply distribution piece 231 is connected on one side with a feed line 2311 and on the other side with input connections of pipeline windings 221 and 222 for the supply of the medium flows, divided half and half, to these windings. In a corresponding manner the mixing piece 232 (via pieces 241/242, to be subsequently described) is connected with the outputs 2211, 2221 of windings 221 and 222 as well as with a discharge line 2311.

FIG. 1 also shows a very advantageous further development of the present invention, namely for achieving the supplementary objective of a particularly high warming up speed, i.e. a rapid warming up of the medium. Respective heating pieces, designated as 241 and 242, are is inserted in series—in terms of the flow of the medium—with each of the relevant pipeline windings 221 or 222. As can be seen from FIG. 1, each heating piece 241 or 242 is preferably inserted downstream—in terms of the flow—of the relevant pipeline winding 221 or 222, so that with this further developed device of the invention the mixing piece 232 is directly connected with the outputs of heating pieces 241 and 242, and correspondingly is connected with the windings 221 and 222 only via the relevant heating piece.

As illustrated in FIG. 1, this heating piece 241 or 242 respectively can be a straight tube piece which again consists of electrically non-conductive material. The free cross-section of the relevant tube piece 241, 242 is perceptibly smaller than the (average) cross-section of the relevant pipeline winding 221 or 222 arranged in series. Further details concerning the appropriate dimensioning of sectional and longitudinal ratios will be understood from the following description. The heating pieces need not be wound around a magnetic core, as current induction in the heating pieces is not necessary according to the present invention. Rather, the function of such a heating piece is that the short circuit current, which is induced on account of the induction in the pipeline windings and flowing in the closed path, has a correspondingly higher current density in the significantly narrower cross-section of the relevant heating piece and thereby evokes a higher thermal source density. The above-mentioned current path for the electric short-circuit current here consists of the supply distribution piece 231, the pipeline winding 221, the heating piece 241, the mixer piece 232, the heating piece 242, the pipeline winding 222 and again the supply distributor 231. In this closed path the above-described short-circuit current which is generated through the induction occurring in the windings 221 and 222 can flow in the medium present in these pipeline parts and warm the medium by joulean heat generation. As can also be seen from FIG. 1, both the heating pieces 241 and 242 preferably lie closely adjacent, namely in order to keep the induction surface therebetween as small as possible.

With regard to a suitable dimensioning of the ratio of the length of the pipeline and the free cross-section of the pipeline of a winding 221/222 on the one hand to the pipe length and the free cross-section of the corresponding heating piece 241/242 on the other hand, the investigations undertaken hitherto have lead to the conclusion that it is optimal to choose the respective longitudinal and cross-sections dimensionings as follows. The dimensionings are to be such that, for the short-circuit current, the electric resistance of the heating piece 241/242 measured over its length is approximately half to approximately double the electric resistance of the pipeline winding 21/222 in series therewith, measured over its length. This means that the respective winding 221/222, preferably having many turns and thus also a relatively long pipeline length for achieving the desired high level of induction, should correspondingly be provided with a relatively large cross-section, whereas the respective heating piece 241/242, which is to have a comparatively narrow free cross-section in order to provide a high current density in the medium, should be relatively short.

In particular on account of the above-mentioned dimensional relationship, it is expedient to utilize the available winding space on the magnetic yoke 14 for the pipeline windings 221 and 222 to the fullest possible extent, whereby with the preferred toroidal form of the magnetic yoke the available winding space on the inside of the yoke is naturally smaller than that on the outside. Therefore, it is advantageous, according to a further embodiment of the invention, to optimally utilize the respective available winding spaces on the inside and outside. The cross-section or the cross-sectional form of the pipeline of the winding 221/222 is advantageously so dimensioned that, on the inside and the outside, the respective winding space along the inner lateral edge or along the outer lateral edge of the magnetic yoke is fully utilized by close packing. FIG. *2a* shows in a partial view a schematic representation which illustrates a sector part of the toroid-shaped yoke 14 and suitable cross-sections $Q_i$ and $Q_a$ of the pipeline of a pipeline winding 221/222, namely how they are expediently provided on the inner and on the outer surface of the yoke according to this further development. FIG. *2b* is a broken away side sectional view of FIG. *2a.*

Although the heating elements have no part in the inductive energy transfer, i.e. are actually just load elements with no voltage induction, their utilization has proved to be of great value, in particular for a high heating up speed of the medium. With the heating element the skilled man is in particular given for each individual case further possibilities for varying the apparatus to influence the heating program or temporal development as desired in each individual case. In principle, a heating element can also be formed as an induction winding on the magnetic yoke, however this leads to such constructional outlay that the economicalness of the device according to the present invention could be significantly reduced.

If, on account of the flow conditions in the regions close to the walls of the heating element the medium remains there longer/flows at a lower speed, the medium there can locally overheat. According to a further embodiment of the above-mentioned development of the invention having heating elements, the occurrence of this effect can be controlled. This further embodiment will be adopted, when any possibility of overheating, even for only part volumes of the medium must in fact be eliminated. This further embodiment is based on providing a helix-form pipeline piece for the heating element instead of a straight pipe piece (as is shown for the sake of simplicity in the outline illustration of FIG. 1). FIG. *3a* shows such a helix-formed heating element 1241/1242, which can be utilized instead of a heating element 241/242 in a device according to the invention with additional heating elements.

Practical tests have shown that with this measure, which can be carried through technically without difficulty, a thorough mixing of the flowing medium in the interior of the heating element can be achieved on account of centrifugal force effects. By means of this purposive mixing of the medium in the heating element, part volumes of the medium remain close to the walls of the heating element only for a short periods and are rapidly exchanged against part volumes from areas with a higher speed of flow.

A mixing achieved as described above can also be achieved, in accordance with FIG. *3b,* by means of internal fittings 2443, obstructions to the flow, and the like in the pipe piece of a heating element. With such configurations a good technical effect could likewise be achieved, as was achieved with the above-described configuration having a helix-form heating element.

The magnetic yoke 14, known per se, has already been described above. This magnetic yoke is a very significant part of the device according to the present invention, for which particularly preferred configurations will be described below, which have shown themselves to be advantageous for the overall efficiency of the device according to the invention.

The FIGS. *4a* and *4b* show in sectional representation a top view and a side view of a particularly preferred configuration of a magnetic yoke 14. In these Figures a toroid-shaped magnetic yoke is shown. However, these further configurations can also be applied to forms of the magnetic yoke which deviate from the form of the illustrated toroid (as is, for example, shown by FIG. 1).

FIG. *4a* shows in a top view, as section B–B′ of FIG. *4b,* a ring or a ring-like disk 141, made of a strip, of amorphous or nanocrystalline material, wound to form a ring strip core such as is used for transformer cores of the indicated frequency range. From the representation of section A–A′ of FIG. *4a* provided by FIG. *4b* it can be seen how e.g. three such ring disks 141, 142 143 are axially arranged one above another as a magnetic yoke 14. Through e.g. spacers these ring disks 141, 142, 142 are kept spaced apart from one another. A temperature and form-resistant casting compound, e.g. a duroplast such as fiber glass-epoxy resin laminate, is designated as 145, and as can be seen from FIG. *4a/4b* contacts sealingly the ring disks 141, 142, 143 on the radial inside of their arrangement, and therewith also serves as a spacer. Such a sealed connection is also present on the respective outer edge of these ring disks, except in the region of the zones 146 and 147 which are formed for supplying and discharging a cooling agent. This cooling agent flows within the covering 145 along the axial lateral surfaces of the ring disks 141,142, 143 in correspondence with the indicated direction of flow of the cooling agent from zone 146 to zone 147. With the aid of the cooling agent these clearly extensive surfaces of the axial sides of the ring disks 141, 142, 143 are intensively cooled. Apart from the zones 146 and 147 an exchange of the cooling agent from the ring zone between two ring disks into the ring zone lying between two other ring disks is impossible and in particular no ring-like flow around one or more of the ring disks' cross-sections (141 to 143) is possible, because, as mentioned before, the covering 145 outside these zones lies tightly against the radial end sides of the ring disks. Therewith electric induction currents in the cooling liquid, otherwise possible, are prevented.

Figure 5:
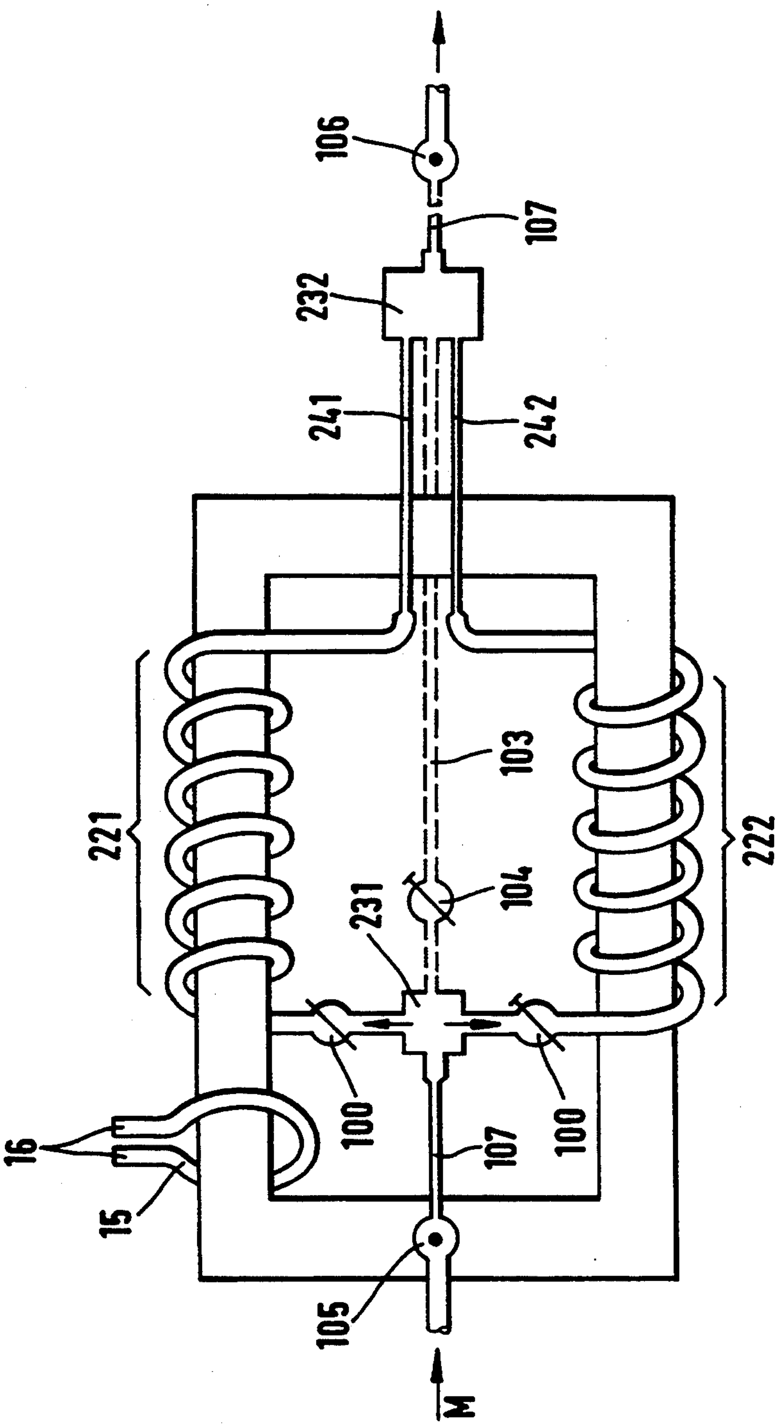
FIG. 5 shows a device according to the present invention with flow regulators, in a partial view.

FIG. 5 shows further configurations of the invention which can be provided in a device according to the invention and in a device (FIG. 1) which is further developed with supplementary heating elements.

With regard to the short circuit current to be generated and with regard to the desired heating up of the medium it is advantageous, in particular in the case of earthing which will be subsequently described, that the flows of the medium are of the same size in terms of quantity in both pipeline windings 221 and 222, in which equal induction voltages are to occur. In order to correct unavoidable flow imbalances which do occur in practice, a flow-rate controller 100 is provided in at least one, possibly in both flow paths of the windings 221 and 222 between the supply distributor 231 and the mixing piece 232. It can be advantageous to additionally provide a compensating line 103, likewise with a rate controller. With the aid of through-flow measuring devices known per se, the flows in the individual flow paths can be measured.

Figure 6:
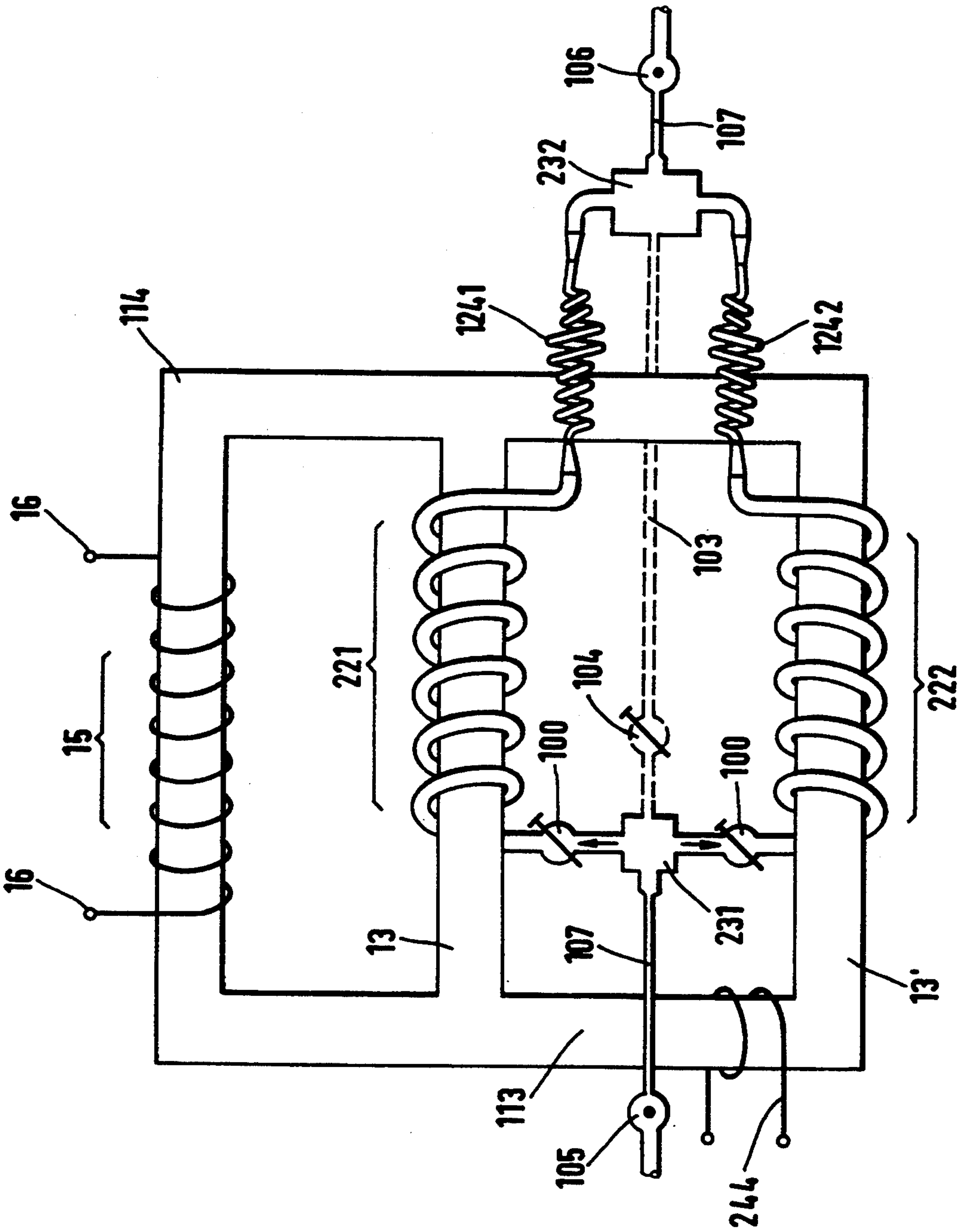
FIG. 6 shows an embodiment with separately controllable magnetic field excitement for parallel magnetic branches.

The pipelines are, as mentioned above, electrically non-conductive. In the present invention electric current and in particular potential compensating currents flow only in the medium. However, it is desired to be able to maintain the medium at a controlled potential, without however impairing the functioning of the device according to the invention. Grounding points in the flow system of the device according to the present invention, provided in accordance with further developments, are designated as 105 and 106. It is particularly advantageous to arrange these grounding points outside the flow paths which lie between the supply distributor 231 and the mixer 232. FIGS. 5 and 6 show a preferred exemplary embodiment, in which a first grounding contact 105 is provided in the supply line leading to supply distributor 231. It is expedient to provide the line 107—at least over a part of the path length between this grounding point and the supply distribution piece 231—with a relatively small cross-section, through which the medium will have to be pumped with an increased speed of flow but in which the electrical resistance is comparatively high compared to the electrical resistances within the above-described short circuit current path. Through this line 107 the potential compensation may occur with sufficiently small grounding currents. This grounding point is preferably such that in the interior of the feed line, preferably in a cross-sectional enlargement thereof, there is a bolt-like electrode of e.g. stainless steel. It is advisable that this electrode has no points or sharp edges and preferably only well rounded surfaces, in order to avoid any electric current density concentrations on this bolt (where undesired electrochemical processes might occur on the grounding contact). The Figures show a similar grounding device on the discharge side of the device according to the invention, behind the mixer piece 232, with the grounding contact 106 and line 107 formed corresponding to that described above.

For the pipelines used in the device according to the present invention and in particular for those of the windings a combined construction made of glass/plastics formed parts is to be recommended.

FIG. 1 shows an arrangement with windings 221 and 222 arranged on a magnetic yoke 14 and which, with reference to the (momentary) magnetic flow in the magnetic yoke and in consideration of the induction, are connected in series. In order for the induced voltages of both the windings 221 and 222 to sum together to produce the common short circuit current, both the windings 221 and 222 must have the same winding sense on the yoke.

In order to be able to influence the induction in the two windings 221 and 222 independently of each other, if appropriate, there can be used a configuration of the magnetic yoke and of the resulting inductions, such as is schematically illustrated in principle in FIG. 6.

In FIG. 6 the details corresponding to those in above-described Figures have corresponding reference signs.

The magnetic yoke 114 which is used in the configuration of FIG. 6, instead of magnetic yoke 14, has two magnetic branches 13 and 13' which are magnetically connected in parallel and are combined in that part of the yoke having the excitation coil. The mode of function of an arrangement according to FIG. 6 is the same is as described for FIG. 1, namely the current flow which causes the heating of the medium and occurring in the short-circuit current path is generated by means of induction in the pipeline windings 221 and 222. For FIG. 6, however, care has to be taken that opposed senses of winding are provided for windings 221 and 222, because the two magnetic arms 13 and 13' are connected in parallel with regard to the induction flow, as is shown the Figure.

For the configuration of FIG. 6 there is also provided in the magnetic branch 13' an additional excitation winding 244. By means of this additional excitation winding, which is fed in phase with the excitation winding 15, and by setting the excitation current, the magnitude of induction in the winding 222 as compared to winding 221 can be differently set. In this way similar induction voltages, or a balancing of the inductive heating effects on the medium in the part flows through the windings 221 and 222—as described above—can be achieved in these windings by means of the magnetic excitation.

Figure 7:
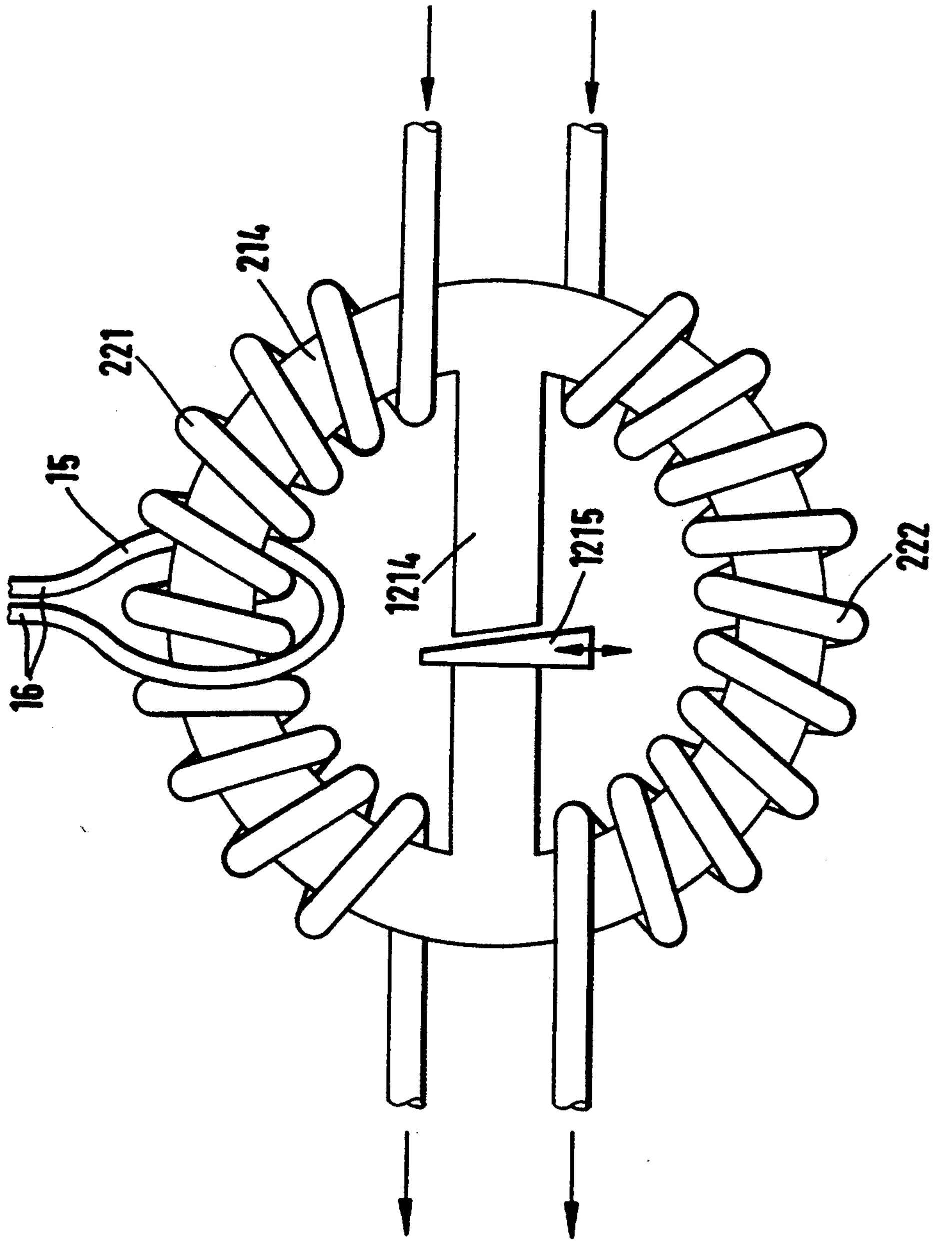
FIG. 7 shows a representation of the principles of a magnetic yoke with an adjustable magnetic shunt/short circuit branch.

FIG. 7 shows a further configuration of a magnetic yoke. This is a magnetic yoke 214 which corresponds on the one hand with the principle of the magnetic yoke 14 having a common magnetic circuit for the two pipeline windings. The magnetic flux generated by the excitation coil 15 flows through both these two windings 221/222, essentially arranged in series as in embodiments of the FIGS. 1 and 5. On the other hand there is provided a magnetic shunt/short-circuit branch 1214 which makes the magnetic flux in the region of the second pipeline winding 222 (which is not surrounded by the coil 15) variable to lower values as a result of the magnetic shunting of the branch 1214. This reduction is controllable by means of an air gap 1215 which can be mechanically varied and is part of the magnetic shunt circuit 1214.

Further details of this representation in FIG. 7 have for the relevant reference signs the same significance as previously indicated.

We claim:

1. Device for the inductive heating of a pumpable medium flowing through the device, the medium having an electrical conductivity in the order of electrolytic conductivity, comprising an energy-supply apparatus having a magnetic yoke (14, 114, 214) with at least one ferromagnetic core and with at least one magnetic field coil (15) arranged on this magnetic yoke with electric current connections for the connection of an alternating current source as primary source of an inductive energy transfer, two pipelines, each having a first and a second end, which are each arranged on the magnetic yoke in a helix-form as a pipeline winding (221, 222) and filled with the medium, effective as a secondary winding of the inductive energy transfer, a delivery arrangement (2311) and a discharge arrangement (2321) for the medium which flows through the device, a supply distribution piece (231), for dividing the flow of the medium, which is arranged between the delivery arrangement and the first ends of the pipeline windings, said supply distribution piece joining said delivery arrangement and said first ends of the pipeline windings to facilitate flow of said medium therethrough, a mixer piece (232) provided for recombining the part flows of the pipeline windings, which piece is inserted between the second ends of the pipeline windings and the discharge device, joining these three parts in terms of flow, whereby the direction in the winding of the respective pipeline windings, with reference to a momentary magnetic field direction in the magnetic yoke within the region of each respective pipeline winding, is selected in correlation with each other such that in a closed path, formed of a series provided by the supply distribution piece, the first pipeline winding, the mixer piece, the second pipeline winding and thereafter the supply distribution piece, the induced electrical potentials in these pipeline windings are amplifyingly added.

2. Device according to claim 1, comprising at least one flow regulating device (100) for controlling the quantity of flow through a respective pipeline winding (221, 222).

3. Device according to claim 1, wherein said magnetic yoke (14) includes a plurality of ring-like disks, each of which is constructed as ring strip core, mutually axially arranged and spaced apart from one another (141, 142, 143), said ring-like disks (141, 142, 143) being retained in a housing (145) which sealingly contacts these ring-like disks at their radial sides, with the exception of the supply and discharge zones (146, 147) and the housing (145) has supply and discharge connections for cooling liquid flowing through the housing between the ring-like disks, which liquid flows along the axial sides of the disks.

4. Device according to claim 1, wherein said magnetic yoke (114) has two magnetic branches (13, 13') which are magnetically connected in parallel for the two pipeline windings, and the respective magnetic flux in one branch is variably controllable, relative to the other branch, by means of an additional magnetic field coil (244).

5. Device according to claim 1 wherein said magnetic yoke (214) is essentially formed as a common magnetic circuit with regard to the magnetic excitation (15) for the two pipeline windings (221, 222), and which is additionally provided with a magnetic shunt/short circuit branch (1214) having an air gap (1215) which divides the common magnetic circuit into a first part with the magnetic excitation (15) and one of the pipeline windings (221) and into a second part with the other pipeline winding (222), whereby the dimensioning of the air gap (1215) is controllable, for the purpose of varying the magnetic excitation effective in the other pipeline winding (222).

6. Device for the inductive heating of a pumpable medium flowing through the device, the medium having electrical conductivity of the order of electrolytic conductivity, comprising an energy-supply apparatus having a magnetic yoke (14, 114, 214) with at least one ferromagnetic core and with at least one magnetic field coil (15) arranged on this magnetic yoke with electric current connections for the connection of an alternating current source as primary source of an inductive energy transfer, a first and a second pipeline, each of which has a first and a second end, each being arranged in helix-form as a pipeline winding (221, 222) on the magnetic yoke and filled with the medium, effective as a secondary winding of inductive energy transfer, a first and a second heating pipeline element (241, 242), each with a first and a second end, of which the first end of the first pipeline element is connected with the second end of the first pipeline winding and of which the first end of the second pipeline element is connected with the second end of the second pipeline winding, dimensioning of the length and cross-section of each pipeline winding and dimensioning of the length and the cross-section of the heating pipe element connected with the respective pipeline winding being such that an electric resistance encountered over the length of the heating pipe element, of the medium flowing therein, is approximately one-half to approximately double that of an electrical resistance encountered over the length of the pipeline winding, a delivery arrangement (2311) and a discharge arrangement (2321) for the medium flowing through the device, a supply distribution piece (231), inserted between the delivery arrangement and the respective first ends of the pipeline windings, for dividing the flow of the medium, said supply distribution piece joining said delivery arrangement and said first ends of the pipeline windings to facilitate flow of said medium therethrough, a mixer piece (232) provided for recombining the part flows of the two pipeline windings, which piece is inserted between the respective second ends of the heater pipeline pieces (241, 242) and the discharge arrangement, joining these three parts in terms of flow, whereby the direction in the winding of the respective pipeline windings, with reference to a momentary magnetic field direction in the magnetic yoke within the region of each respective pipeline winding, is selected in correlation with each other such that in a closed path, formed of a series provided by the supply distribution piece, the first pipeline winding, the first heating pipeline element, the mixer piece, the second heating pipeline element, the second pipeline winding and again the supply distribution piece, the induced electrical potentials in these pipeline windings are augmentatively added.

7. Device according to claim 6, in which the heating pipeline elements are formed helix-like.

8. Device according to claim 6, in which the heating pipeline elements are provided with components in their interiors for causing turbulence in the flow of the medium.

9. Device according to claim 6, comprising at least one flow regulating device (100) for controlling the quantity of flow through a respective pipeline winding (221, 222).

10. Device according to claim 6, comprising at least one flow regulating arrangement (100) for controlling the quantity of flow through a respective pipeline winding (221, 222) and with helix-like heating pipeline elements (1241, 1242).

11. Device according to claim 6, wherein said magnetic yoke (14) includes a plurality of ring-like disks, each of which is constructed as ring strip core, mutually axially arranged and spaced apart from one another (141, 142, 143), whereby these ring-like disks (141, 142, 143) are retained in a housing (145) which sealingly contacts these ring-like disks at their radial ends, with the exception of the supply and discharge zones (146, 147) and the housing (145) has supply and discharge connections for cooling liquid flowing through the housing between the ring-like disks, which liquid flows along the axial sides of the disks.

12. Device according to claim 6, comprising magnetic yoke (114) having two magnetic branches (13, 13') which are magnetically connected in parallel for the two pipeline windings, whereby the respective magnetic flux in one branch is variably controllable, relative to the other branch, by means of an additional magnetic field coil (244).

13. Device for the inductive heating of a pumpable medium flowing through the device, the medium having an electrical conductivity in the order of electrolytic conductivity, comprising an energy-supply apparatus having a magnetic yoke (14, 114, 214) with at least one ferromagnetic core and with at least one magnetic field coil (15) arranged on this magnetic yoke with electric current connections for the connection of an alternating current source as a primary source of an inductive energy transfer, a first and a second pipeline, each of which has a first and a second end, each being arranged in helix-form as a pipeline winding (221, 222) on the magnetic yoke and filled with the medium, effective as a secondary winding of inductive energy transfer, a first and a second heating pipeline element (241, 242), each with a first and a second end, of which the first end of the first pipeline element is connected with the second end of the first pipeline winding and of which the first end of the second pipeline element is connected with the second end of the second pipeline winding, the dimensioning of the length and cross-section of each pipeline winding and dimensioning of the length and the cross-section of the heating pipe element connected with the respective pipeline winding being such that the electric resistance encountered over the length of the heating pipe element, of the medium flowing therein, is approximately one-half to approximately double that of the electrical resistance encountered over the length of the pipeline winding, a delivery arrangement (2311) and a discharge arrangement (2321) for the medium flowing through the device, a supply distribution piece (231), inserted between the delivery arrangement and the respective first ends of the pipeline windings, for dividing the flow of the medium, said supply distribution piece joining said delivery arrangement and said first ends of the pipeline windings to facilitate flow of said medium therethrough, a mixer piece (232) provided for recombining the part flows of the two pipeline windings, which piece is inserted between the respective second ends of the heater pipeline pieces (241, 242) and the discharge arrangement, and joining said components in a flow relationship, a first grounding contact (105) which is arranged in the delivery arrangement (2311) in the flow path of the medium placed upstream of the supply distributor and including a second grounding contact (106) which is arranged in discharge arrangement (2321) in the flow path of the medium placed downstream of the mixer piece, whereby the direction of winding of the respective pipeline windings, with reference to a momentary magnetic field direction in the magnetic yoke within the region of each respective pipeline winding, is selected relative to each other such that in a closed path, formed of a series provided by the supply distribution piece, the first pipeline winding, the first heating pipeline element, the mixer piece, the second heating pipeline element, the second pipeline winding and again the supply distribution piece, the induced electrical potentials in these pipeline windings are augmentatively added.

14. Device according to claim 13, in which the heating pipeline elements are formed helix-like.

15. Device according to claim 13, in which the heating pipeline elements are provided with components in their interiors for causing turbulence in the flow of the medium.

16. Device according to claim 13, comprising at least one flow regulating device (100) for controlling the quantity of flow through a respective pipeline winding (221, 222).

17. Device according to claim 13, comprising at least one flow regulating arrangement (100) for controlling the quantity of flow through a respective pipeline winding (221, 222) and including helix-like heating pipeline elements (1241, 1242).

18. Device according to claim 13, wherein said magnetic yoke (14) includes a plurality of ring-like disks, each of which is constructed as ring strip core, mutually axially arranged and spaced apart from one another (141, 142, 143), wherein said ring-like disks (141, 142, 143) are retained in a housing (145) which sealingly contacts these ring-like disks at their radial ends, with the exception of the supply and discharge zones (146, 147) and the housing (145) has supply and discharge connections for cooling liquid flowing through the housing between the ring-like disks, which liquid flows along the axial sides of the disks.

19. Device according to claim 13, comprising a magnetic yoke (114) having two magnetic branches (13, 13') which are magnetically connected in parallel for the two pipeline windings, whereby the respective magnetic flux in one branch is variably controllable, relative to the other branch, by means of an additional magnetic field coil (244).

20. Device according to claim 13, comprising a magnetic yoke (214), which is essentially formed as a common magnetic circuit with regard to the magnetic excitation (15) for the two pipeline windings (221,222), and has additionally provided a magnetic shunt/short circuit branch (1214) with an air gap (1215) which divides the common magnetic circuit into a first part with the magnetic excitation (15) and one of the pipeline windings (221) and into a second part with the other pipeline winding (222), whereby the dimensioning of the air gap (1215) is controllable, for the purpose of varying the magnetic excitation effective in the other pipeline winding (222).

* * * * *